United States Patent [19]

Morrisette

[11] 4,403,110

[45] Sep. 6, 1983

[54] ELECTRICAL CABLE SPLICE

[75] Inventor: Milton J. Morrisette, Ashland, Mass.

[73] Assignee: Walter Kidde and Company, Inc., Clifton, N.J.

[21] Appl. No.: 263,982

[22] Filed: May 15, 1981

[51] Int. Cl.$^3$ .......................................... H02G 15/18
[52] U.S. Cl. .................................... 174/84 R; 174/76
[58] Field of Search ................... 174/84 R, 84 C, 76, 174/92, 138 F, 88 R

[56] References Cited

U.S. PATENT DOCUMENTS

| 2,967,795 | 1/1961 | Bollmeier et al. | 174/84 R |
| 4,025,717 | 5/1977 | Whittingham | 174/84 R |
| 4,172,964 | 10/1979 | Reinebach | 336/96 X |

FOREIGN PATENT DOCUMENTS 2325764 1/1974 Fed. Rep. of Germany ........ 174/76

Primary Examiner—A. T. Grimley
Assistant Examiner—D. A. Tone
Attorney, Agent, or Firm—John E. Toupal; Harold G. Jarcho

[57] ABSTRACT

An assembly including a pair of cable sections having cable ends joined in a splice and an elongated sheath enclosing the cable ends. The elongated sheath defines opposite end openings, each receiving one of the cable sections and having a perimeter substantially conforming to the outer surface thereof. Further defined by the interior of the sheath are both contact surfaces engaging and positioning certain portions of the cable sections' outer surfaces and volumes juxtaposed other portions of those surfaces. A filler material fills the volumes and bonds the sheath to the outer surfaces of the cable sections so as to establish a secure connection therebetween. In a preferred embodiment of the invention, the cable sections comprise electrical conductors jacketed by insulative sleeves that form the outer surfaces and the filler material is electrically insulative.

9 Claims, 6 Drawing Figures

ELECTRICAL CABLE SPLICE

BACKGROUND OF THE INVENTION

This invention relates generally to a cable splice assembly and, more particularly, to an electrical conductor cable splice assembly.

Ends of electrical cables must often be spliced together in order to complete electrical circuits connected to opposite ends of the cables. Splices are used, for example, to join the ends of a cable that has been inadvertently severed during work operations. In addition, splices are often used to join a new cable length to an existing cable in order to enlarge the area in which power is available from an existing source. Although many techniques are employed to splice electrical cable, distinct problems are presented for those applications in which the cable is used in a wet environment. In those instances, the exposed ends of joined electrical conductors must be fluid tightly sealed with suitable electrical insulation to prevent conductive moisture paths that would constitute shock or electrocution hazards. Wet environments requiring fluid tightly sealed splices are encountered, for example, in many mining operations.

A known technique for creating fluid sealed splices entails the in situ molding of an insulative material around the joined ends of electrical conductors. According to one approach, a cylindrical boot is first positioned over the ends of the joined cable and then filled through a fill opening with a settable electrically insulative resin compound. Problems associated with this technique result from any failure to completely encapsulate the exposed conductors and to create a fluid tight seal between the cylindrical boot and the cable's insulative covering. This problem is accentuated by the typically high viscosity of the resin compounds utilized. Because of that factor and deficiencies in the geometrical configuration of prior splicing boot assemblies, the attainment of completely safe, fluid tightly sealed electrical cable splices have involved very costly requirements of labor and material.

The object of this invention, therefore, is to provide relatively inexpensive, fluid tightly sealed splices of electrical cable.

SUMMARY OF THE INVENTION

The invention is an assembly including a pair of cable sections having cable ends joined in a splice and an elongated sheath enclosing the cable ends. The elongated sheath defines opposite end openings, each receiving one of the cable sections and having a perimeter substantially conforming to the outer surface thereof. Further defined by the interior of the sheath are both contact surfaces engaging and positioning certain portions of the cable sections' outer surfaces and volumes juxtaposed other portions of those surfaces. A filler material fills the volumes and bonds the sheath to the outer surfaces of the cable sections so as to establish a secure connection therebetween. In a preferred embodiment of the invention, the cable sections comprise electrical conductors jacketed by insulative sleeves that form the outer surfaces and the filler material is electrically insulative. In addition to bonding the sheath to the insulative sleeves so as to securely connect the cable sections, the filler material fluid tightly encapsulates the joined electrical conductors.

According to one feature of the invention, the sheath includes a central fill opening preferably accommodating a one-way valve mechanism. The fill opening facilitates the injection of the filler material into the volumes within the sheath and the one-way valve permits the filling thereof under pressure.

According to another feature of the invention, the contact surfaces include a plurality of circumferentially spaced surfaces extending longitudinally between the opposite end openings of the sheath and the filled volumes lie between the spaced apart contact surfaces. The longitudinally and circumferentially distributed contact surfaces and filled volumes insure accurate positioning of the cable sections within the sheath and a secure bonding thereof to the outer surfaces of the cable sections by the filler material.

In one embodiment of the invention, the contact surfaces are planar and lie tangent to the outer surfaces of the cable sections. The tangential contact surfaces accurately position the cable sections within the sheath.

In another embodiment of the invention, the contact surfaces comprise the extremeties of ridges that extend longitudinally on the inner surface of the sheath. The ridges both position the cable sections and maximize the size of the filler material filled volumes that establish bonds between the sheath and the cable sections.

DESCRIPTION OF THE DRAWINGS

These and other objects and features of the present invention will become more apparent upon a perusal of the accompanying drawings wherein.

DESCRIPTION OF THE PREFERRED EMBODIMENTS

Figure 1:
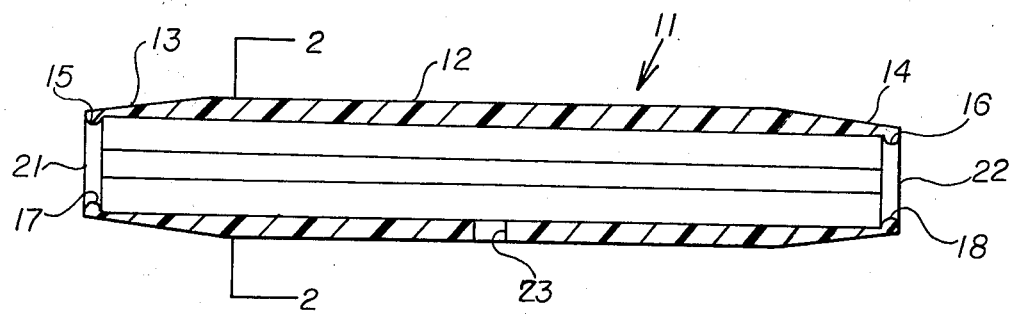
FIG. 1 is a schematic cross-sectional view of a sheath for creating a cable splice in accordance with the invention.
Figure 2:
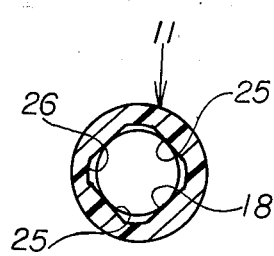
FIG. 2 is a schematic cross-sectional view taken along lines 2—2 of FIG. 1.

Illustrated in FIG. 1 is an elongated hollow sheath 11 having a central portion 12 with an outer surface of circular cross-section and end portions 13 and 14 with inwardly tapered outer surfaces. The sheath 11 is formed of a suitable electrical insulative material such as Urethane. Terminating the end portions 13, 14, respectively, are inwardly projecting annular ridges 15 and 16 having curved peripheries that form O-ring type sealing surfaces 17 and 18. The O-ring surfaces 17 and 18 define openings 21 and 22 at opposite ends of the elongated sheath 11. Also defined in the central portion of the sheath 11 is a fill opening 23. As shown in FIG. 2, the interior of the sheath 11 has a substantially square cross section that defines planar contact surfaces 25. The corners between the planar contact surfaces 25 are flattened to form substantially planar intermediate surfaces 26.

Figure 4:
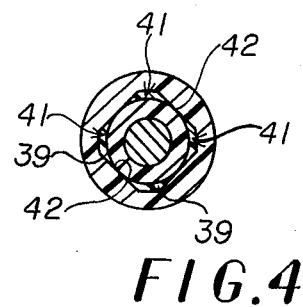
FIG. 4 is a schematic cross-sectional view taken along the lines 4—4 of FIG. 3.
Figure 3:
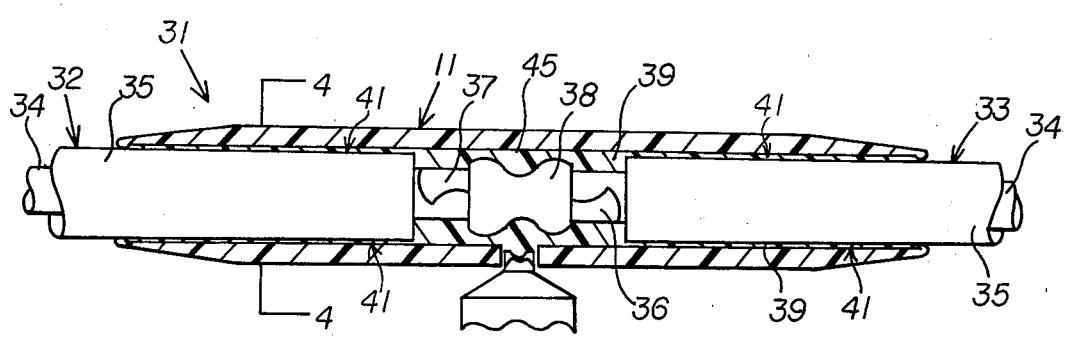
FIG. 3 is a schematic cross-sectional view of a cable splice utilizing the sheath of FIG. 1.

Referring now to FIGS. 3 and 4, the sheath 11 is shown as part of a cable splice assembly 31. Received by the end openings 21 and 22, respectively, are electrical cable sections 32 and 33. Each of the cable sections 32, 33 comprises a central electrical conductor 34 covered by an insulator sleeve 35. Within the sheath 11, exposed ends 36, 37 of the conductors 34 are joined by a cylindrical connector 38 formed of an electrically conductive material such as copper. The connector 38 is a hollow cylindrical member that receives the conductor ends 36 and 37 and is crimped to mechanically secure them. Encapsulating the exposed ends 36, 37 of the conductors 34 and the connector 38 is an electrically insulative fill material 39. The fill material 39 also fills volumes 41 between the outer surfaces of the insulative sleeves 35 and both the intermediate surfaces 26 and the contact surfaces 25. Contact is made along tangential lines of contact 42 between the outer surfaces of the sleeves 35 and the contact surfaces 25. As shown in FIGS. 3 and 4, the tangential surfaces of contact 42 are circumferentially distributed around the cable sections 32, 33 and extend longitudinally between the end openings 21, 22 of the sheath 11. Similarly, the volumes 41 defined between the surfaces of contact 42 are circumferentially distributed and extend longitudinally between the end openings 21, 22 of the sheath 11.

During assembly of the splice 31, the sheath 11 is first passed over one of the conductor ends 36 or 37 and onto one of the cable sections 32 or 33. After insertion of the conductor ends 36 and 37, the connector 38 is crimped to establish a mechanical securement thereof. The sheath 11 is then moved over the joined conductor ends 36 and 37 and the other section 22 or 33 as shown in FIG. 3. After this initial assembly, the splice 31 is completed by injection through the fill opening 23 of the fill material 39 to completely fill the void 45 around the conductor ends 37, 36 and the connector 38 and the volumes 41 defined between the sheath 11 and the outer surfaces of the cable sections 32, 33. Preferably, the fill material 39 is a settable, multicomponent resin compound that will establish a bond between the sheath 11 and the insulative sleeves 35 on the cable sections 32, 33. A suitable multi-component settable resin comprises a polyether urethane resin and an isocyanate activator. The fill material 39 preferably in injected into the sheath 11 through the fill opening 23 by an injection syringe of the type disclosed in my co-pending patent application Ser. No. 263,873, filed May 15, 1981 entitled "Apparatus For Mixing And Dispensing Liquids" and commonly assigned with this application.

During injection, the fill material 39 fills the void 45 and then is forced through the longitudinally extending volumes 41 toward the end openings 21, 22. During the filling process, air trapped in front of the moving fill material 39 is vented through the openings 21, 22 by the resilient annular O-rings 15, 16 that expand slightly in response to internal pressure. However, after completely filling the volumes 41, the much more viscous fill material 39 is retained within the sheath 11 until a substantially uniform minimum pressure is created therewithin. A complete filling of the void 45 and the volumes 41 is indicated by an emission of fill material 39 out of the sheath 11 via the O-ring seals 15, 16. After a time period required for setting, the fill material 39 totally encapsulates the previously exposed conductor ends 36, 37 and creates a bond between the sheath 11 and the insulative sleeves 35 on the cable sections 32, 33.

Figure 5:
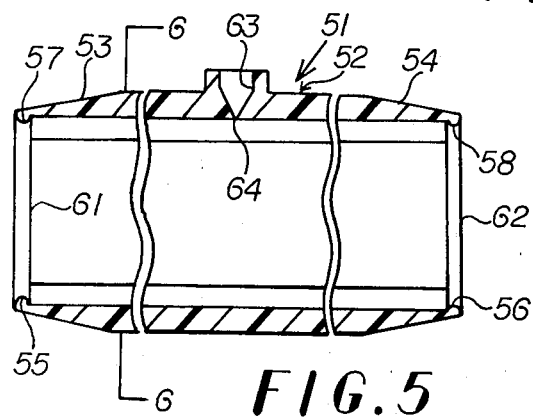
FIG. 5 is a schematic cross-sectional view of a modified sheath embodiment of the invention.
Figure 6:
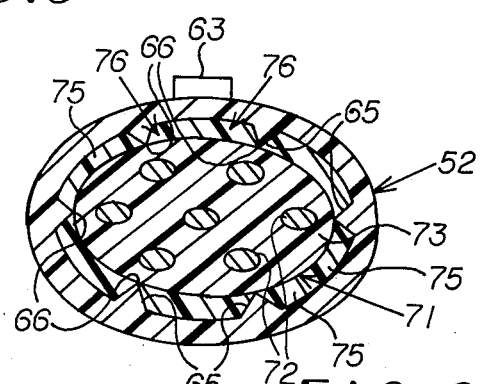
FIG. 6 is a schematic cross-sectional view taken along lines 6—6 of FIG. 5 but including a cable section within the sheath.

Referring now to FIGS. 5 and 6, there is shown another embodiment 51 including a hollow sheath 52 with an elliptically shaped cross section and end portions 53, 54 with inwardly tapered out surfaces. Terminating the end portions 53 and 54, respectively, are inwardly projecting annular ridges 55 and 56 having curved peripheries that form O-ring type sealing surfaces 57, 58. The surfaces 57, 58 define openings 61 and 62 at opposite ends of the sheath 52. Also defined by the sheath 52 is a centrally located fill opening 63. The lower walls of the opening 63 slope downwardly to a slit 64 so as to form a check valve assembly. As shown in FIG. 6, the interior of the sheath 52 defines a plurality of elongated ridges 65 of triangular cross section. The apices 66 of the ridges 65 form contact surfaces that are circumferentially spaced apart and extend longitudinally between the openings 61 and 62. Positioned within the sheath 52 in FIG. 6 is a cable section 71 comprising a plurality of conductors 72 encapsulated within an electrically insulative covering 73. The contact surfaces 66 tangentially engage the outer surface of the insulator covering 73. Formed between the interior surface of the sheath 52 and the covering 73 are a plurality of elongated volumes 76 containing a fill material 75.

The sheath 52 is used in the same manner as described above for the sheath 11. However, in this embodiment 51, the sheath 52 accommodates cable sections with a plurality of conductors 72. Also, the contact surfaces 66 formed by the elongated ridges 65 position the cable sections 71 while insuring minimum surface contact between the interior of the sheath 52 and the insulative covering 73. Thus, substantially the entire surfaces of the sheath 52 and the covering 73 are intimately bonded together by the fill material 75. Another advantage of the embodiment 51 is provided by the check valve assembly 64 which restricts fluid flow out of the sheath 52. Because of the valve 64, the sheath can be filled under pressure with material 75 thereby insuring a complete filling of the cavities 76.

Obviously, many modifications and variations of the present invention are possible in light of the above teachings. It is to be understood, therefore, that the invention can be practiced otherwise than as specifically described.

What is claimed is:

1. A splice assembly comprising:
a pair of cable sections having cable ends joined in a splice;
an elongated sheath enclosing said cable ends and defining a centrally located fill opening, said sheath comprising inwardly projecting lips that define opposite end openings, each of said end openings receiving one of said cable sections and having a perimeter substantially conforming to the outer surface thereof, said sheath having an interior that defines contact surfaces engaging and positioning certain portions of said outer surfaces of said cable sections, said interior further defining volumes juxtaposed other portions of said outer surfaces; and
a filler material filling said volumes and bonding said sheath to said outer cable section surfaces.

2. An assembly according to claim 1 wherein said contact surfaces comprise a plurality of circumferentially spaced apart surfaces extending longitudinally between said opposite end openings, and said volumes lie between said spaced apart contact surfaces.

3. An assembly according to claim 2 wherein said spaced apart contact surfaces are planar surfaces lying tangent to said outer surfaces of said cable sections.

4. An assembly according to claim 3 wherein said sheath further defines intermediate planar surfaces located between said spaced apart surfaces and extending longitudinally between said opposite end openings, said planar spaced apart and intermediate surfaces defining said volumes.

5. An assembly according to claim 4 wherein the peripheries of said annular ridges have curved peripheries that tangentially engage said cable sections.

6. An assembly according to claim 2 wherein said contact surfaces are formed by elongated ridges extending longitudinally on said interior of said sheath.

7. An assembly according to claim 6 wherein said elongated ridges have triangular cross sections with apices that engage said outer surfaces of said cable sections.

8. An assembly according to claim 7 wherein the peripheries of said annular ridges have curved peripheries that tangentially engage said cable sections.

9. An assembly according to claim 1 including check valve means located in said fill opening.

* * * * *